United States Patent
Mohammed et al.

(10) Patent No.: US 11,076,613 B2
(45) Date of Patent: Aug. 3, 2021

(54) FROZEN FOOD PRODUCT DISPENSING MACHINE INCLUDING MIXING MANIFOLD

(71) Applicant: The Vollrath Company, L.L.C., Sheboygan, WI (US)

(72) Inventors: Aamer Mohammed, Manitowoc, WI (US); Ken Wetenkamp, Plymouth, WI (US)

(73) Assignee: The Vollrath Company, L.L.C., Sheboygan, WI (US)

(*) Notice: Subject to any disclaimer, the term of this patent is extended or adjusted under 35 U.S.C. 154(b) by 771 days.

(21) Appl. No.: 15/790,888

(22) Filed: Oct. 23, 2017

(65) Prior Publication Data

US 2018/0110238 A1 Apr. 26, 2018

Related U.S. Application Data

(60) Provisional application No. 62/411,866, filed on Oct. 24, 2016.

(51) Int. Cl.
| | |
|---|---|
| *A23G 9/22* | (2006.01) |
| *A23G 9/28* | (2006.01) |
| *G01F 23/16* | (2006.01) |
| *A23G 9/20* | (2006.01) |

(52) U.S. Cl.
CPC ............. *A23G 9/227* (2013.01); *A23G 9/228* (2013.01); *A23G 9/282* (2013.01); *G01F 23/16* (2013.01); *A23G 9/20* (2013.01); *A23G 9/283* (2013.01)

(58) Field of Classification Search
CPC ........ A23G 9/283; A23G 9/227; A23G 9/228; A23G 9/04; A23G 9/045; A23G 9/224; G01F 23/16
USPC ....... 99/452, 323.1; 141/1, 9, 82, 83, 94, 95, 141/98, 192, 193; 62/342, 344, 70; 425/140, 142, 297, 301, 306, 308; 261/121.1, 123, 70
See application file for complete search history.

(56) References Cited

U.S. PATENT DOCUMENTS

| | | | | |
|---|---|---|---|---|
| 2,608,833 | A | * | 9/1952 | Woodruff ............... A23G 9/163 62/348 |
| 3,196,627 | A | * | 7/1965 | Swenson .................. A23G 9/20 62/136 |
| 3,266,672 | A | * | 8/1966 | Dean .................... B67D 1/0858 222/129.1 |

(Continued)

OTHER PUBLICATIONS

Screen captures from YouTube video clip entitled "Stoelting F231 Cleaning" 2 pages, uploaded on Jul. 12, 2016 by user "sweetFrog University". Retrieved from Internet: <https://www.youtube.com/watch?v=DOR1NWiLD9c>. (Year: 2016).*

(Continued)

*Primary Examiner* — Jimmy Chou
(74) *Attorney, Agent, or Firm* — Foley & Lardner LLP

(57) ABSTRACT

A frozen food product dispensing machine includes a housing, a freezer barrel disposed within the housing, a plurality of drawers, and a manifold comprising a plurality of inlets and one outlet. The plurality of drawers are disposed within and slidably coupled to the housing and configured to each support a liquid food product mix reservoir. The inlets are each fluidly coupled to one of the liquid food product mix reservoirs, and the outlet is fluidly coupled to the freezer barrel to supply liquid food product mix from all of the liquid food product mix reservoirs to the freezer barrel.

18 Claims, 12 Drawing Sheets

(56) References Cited

U.S. PATENT DOCUMENTS

| | | | | |
|---|---|---|---|---|
| 3,272,388 A * | 9/1966 | Whitmore | A23G 9/281 | 222/129.1 |
| 3,661,303 A * | 5/1972 | Prosenbauer | A23G 9/281 | 222/309 |
| 3,811,494 A * | 5/1974 | Menzel | A23G 9/04 | 165/65 |
| 4,201,558 A * | 5/1980 | Schwitters | A23G 9/045 | 137/594 |
| 4,378,164 A * | 3/1983 | Manfroni | A23G 9/281 | 366/177.1 |
| 4,420,948 A * | 12/1983 | Savage | A23G 9/28 | 425/150 |
| 4,463,572 A * | 8/1984 | Brown, Jr. | A23G 9/12 | 366/144 |
| 4,580,905 A * | 4/1986 | Schwitters | A23G 9/283 | 222/129.1 |
| 4,606,200 A * | 8/1986 | Nielsen | A23G 9/163 | 251/292 |
| 4,637,221 A * | 1/1987 | Levine | A23G 9/28 | 366/286 |
| 4,703,628 A * | 11/1987 | Togashi | A23G 9/163 | 222/55 |
| 4,732,013 A * | 3/1988 | Beck | A23G 9/12 | 15/250.41 |
| 4,747,272 A * | 5/1988 | Howell | A23G 9/12 | 137/101.21 |
| 4,753,370 A * | 6/1988 | Rudick | B67D 1/0051 | 222/105 |
| 4,758,097 A * | 7/1988 | Iles, Sr. | A23G 9/163 | 366/102 |
| 4,881,663 A * | 11/1989 | Seymour | A23G 9/282 | 222/132 |
| 4,947,742 A * | 8/1990 | Nishibayashi | A23C 20/025 | 99/453 |
| 4,964,542 A * | 10/1990 | Smith | A23G 9/04 | 222/146.6 |
| 5,114,045 A * | 5/1992 | Herpe | A23G 3/28 | 222/105 |
| 5,158,506 A * | 10/1992 | Kusano | A23G 9/163 | 62/136 |
| 5,159,818 A * | 11/1992 | Etou | A23G 9/045 | 222/138 |
| 5,433,084 A * | 7/1995 | Kaiser | A23G 3/0221 | 261/140.1 |
| 5,692,392 A * | 12/1997 | Swier | A23G 9/045 | 222/146.6 |
| 5,706,720 A * | 1/1998 | Goch | A23G 9/20 | 366/149 |
| 5,727,713 A * | 3/1998 | Kateman | A23G 9/04 | 222/145.6 |
| 5,962,035 A * | 10/1999 | Masse | A23G 3/2015 | 425/131.1 |
| 6,010,035 A * | 1/2000 | Estruch | A23G 9/045 | 222/142 |
| 6,119,472 A * | 9/2000 | Ross | A23G 9/16 | 62/228.2 |
| 6,145,701 A * | 11/2000 | Van Der Merwe | A23G 9/163 | 222/145.1 |
| 6,163,095 A * | 12/2000 | Shams | A23G 9/045 | 310/104 |
| 6,220,047 B1 * | 4/2001 | Vogel | A23G 9/045 | 62/342 |
| 6,370,892 B1 * | 4/2002 | Ross | A23G 9/22 | 62/136 |
| 6,490,872 B1 * | 12/2002 | Beck | A23G 9/045 | 62/303 |
| 6,494,055 B1 * | 12/2002 | Meserole | A23G 9/045 | 366/305 |
| 6,553,779 B1 * | 4/2003 | Boyer | A23G 9/20 | 62/342 |
| 6,637,214 B1 * | 10/2003 | Leitzke | A23G 9/163 | 62/342 |
| 6,662,592 B2 * | 12/2003 | Ross | A23G 9/12 | 165/156 |
| 6,735,967 B1 * | 5/2004 | Bischel | F25B 5/02 | 62/196.4 |
| 6,745,592 B1 * | 6/2004 | Edrington | A23G 9/045 | 426/524 |
| 6,830,239 B1 * | 12/2004 | Weber | A23G 9/045 | 261/121.1 |
| 7,047,758 B2 * | 5/2006 | Ross | A23G 9/12 | 366/285 |
| 7,178,976 B2 * | 2/2007 | Gerber | A23G 9/228 | 366/177.1 |
| 7,655,265 B2 * | 2/2010 | D'Arcangelis | A23G 9/285 | 426/231 |
| 7,665,398 B2 * | 2/2010 | Gerber | A23G 9/28 | 99/455 |
| 7,802,593 B2 * | 9/2010 | Koerner | G07F 17/0071 | 141/82 |
| 8,402,781 B2 * | 3/2013 | Cocchi | A23G 9/28 | 62/342 |
| 8,403,179 B1 * | 3/2013 | Gerber | B67D 1/0036 | 222/129.4 |
| 8,496,141 B2 * | 7/2013 | McKay | A23G 9/282 | 222/144.5 |
| 9,060,527 B2 * | 6/2015 | Sipp | A23G 9/12 | |
| 9,259,016 B2 * | 2/2016 | Mohammed | G07F 13/00 | |
| 9,326,530 B2 * | 5/2016 | Ugolini | A23G 9/22 | |
| 9,326,531 B1 * | 5/2016 | Reich | A23G 9/228 | |
| 9,560,865 B2 * | 2/2017 | Cocchi | A23G 9/28 | |
| 9,635,874 B2 * | 5/2017 | Bruckner | G07F 13/10 | |
| 9,661,867 B2 * | 5/2017 | Minard | A23G 9/222 | |
| 9,854,820 B2 * | 1/2018 | Cocchi | A23G 9/281 | |
| 9,968,113 B2 * | 5/2018 | Lazzarini | A23G 9/28 | |
| 10,123,553 B2 * | 11/2018 | Cocchi | A23G 9/281 | |
| 10,321,699 B2 * | 6/2019 | Gates | F25D 31/002 | |
| 10,448,656 B2 * | 10/2019 | Wetenkamp | A23G 9/282 | |
| 10,501,307 B2 * | 12/2019 | Henriquez | B67D 1/0801 | |
| 10,588,330 B2 * | 3/2020 | Cocchi | A23G 9/12 | |
| 10,602,755 B2 * | 3/2020 | Cocchi | A23G 9/16 | |
| 2002/0048626 A1 * | 4/2002 | Miller | B01F 7/161 | 426/590 |
| 2002/0083730 A1 * | 7/2002 | Giroux | B67D 1/02 | 62/354 |
| 2003/0051606 A1 * | 3/2003 | Cusenza | A47J 27/16 | 99/357 |
| 2003/0085237 A1 * | 5/2003 | Kateman | A23G 9/045 | 222/1 |
| 2004/0251270 A1 * | 12/2004 | Davis | A23G 9/281 | 222/2 |
| 2005/0051232 A1 * | 3/2005 | Schmoll | G07F 9/105 | 141/83 |
| 2005/0081554 A1 * | 4/2005 | Ross | A23G 9/228 | 62/342 |
| 2005/0132902 A1 * | 6/2005 | D'Arcangelis | B29C 48/834 | 99/455 |
| 2005/0198990 A1 * | 9/2005 | Kateman | G07F 17/0071 | 62/342 |
| 2006/0090496 A1 * | 5/2006 | Adamski | F25C 5/22 | 62/344 |
| 2006/0277936 A1 * | 12/2006 | Norden | A23G 9/22 | 62/340 |
| 2007/0254084 A1 * | 11/2007 | Cocchi | G01F 23/2845 | 426/565 |
| 2008/0073376 A1 * | 3/2008 | Gist | A23G 9/28 | 222/145.5 |
| 2008/0092752 A1 * | 4/2008 | Morin | G07F 9/105 | 99/356 |
| 2008/0134699 A1 * | 6/2008 | Leaver | F25C 1/00 | 62/129 |
| 2008/0149655 A1 * | 6/2008 | Gist | F25B 5/02 | 221/1 |
| 2008/0223049 A1 * | 9/2008 | Every | F25D 21/006 | 62/80 |
| 2009/0000315 A1 * | 1/2009 | Billman | F25C 5/10 | 62/73 |

(56) References Cited

U.S. PATENT DOCUMENTS

| | | | | |
|---|---|---|---|---|
| 2009/0145924 A1* | 6/2009 | Fiedler | A23G 9/28 | 222/95 |
| 2009/0288429 A1* | 11/2009 | Elsom | A23G 9/28 | 62/68 |
| 2009/0292395 A1* | 11/2009 | DiFatta | F25B 49/005 | 700/275 |
| 2009/0323462 A1* | 12/2009 | Cocchi | A23G 9/30 | 366/147 |
| 2010/0058773 A1* | 3/2010 | Hogan | A23G 9/04 | 62/1 |
| 2010/0062128 A1* | 3/2010 | Khoo | A23F 5/465 | 426/474 |
| 2010/0075013 A1* | 3/2010 | Takata | A23G 9/28 | 426/565 |
| 2010/0242497 A1* | 9/2010 | Bertone | B67D 1/0053 | 62/1 |
| 2010/0293969 A1* | 11/2010 | Braithwaite | A23B 4/26 | 62/62 |
| 2011/0120163 A1* | 5/2011 | Wadle | A23G 9/28 | 62/228.1 |
| 2012/0044781 A1* | 2/2012 | Bravo | A21C 1/1495 | 366/144 |
| 2012/0055189 A1* | 3/2012 | Sipp | A23G 9/12 | 62/342 |
| 2012/0104046 A1* | 5/2012 | Wadle | A23G 9/28 | 62/342 |
| 2012/0217264 A1* | 8/2012 | Cocchi | A23G 9/04 | 222/95 |
| 2012/0251697 A1* | 10/2012 | Cocchi | A23G 9/28 | 426/521 |
| 2012/0312049 A1* | 12/2012 | Downs, III | A23G 9/281 | 62/340 |
| 2013/0136835 A1* | 5/2013 | Fiedler | B67D 1/0462 | 426/524 |
| 2013/0269540 A1* | 10/2013 | Lazzarini | A23C 9/1223 | 99/455 |
| 2014/0295044 A1* | 10/2014 | Cocchi | A23G 9/22 | 426/520 |
| 2014/0356494 A1* | 12/2014 | Cocchi | A23G 9/166 | 426/231 |
| 2015/0216201 A1* | 8/2015 | Bruckner | A23G 9/283 | 700/233 |
| 2015/0246804 A1* | 9/2015 | Fracassi | B67D 1/0004 | 222/129.1 |
| 2015/0320078 A1* | 11/2015 | Cocchi | A23G 9/04 | 141/82 |
| 2015/0342217 A1* | 12/2015 | Elsom | F25D 29/00 | 222/146.6 |
| 2016/0095466 A1* | 4/2016 | Hsu | A47J 31/467 | 99/287 |
| 2016/0198734 A1* | 7/2016 | Cocchi | A23G 9/228 | 426/231 |
| 2017/0049127 A1* | 2/2017 | Weldy | A23G 9/281 | |
| 2017/0094990 A1* | 4/2017 | Mohammed | F16K 31/52408 | |
| 2017/0215456 A1* | 8/2017 | Noth | A23G 9/283 | |
| 2017/0225853 A1* | 8/2017 | Hundley | A23G 9/30 | |
| 2018/0332870 A1* | 11/2018 | Wetenkamp | A23G 9/281 | |

OTHER PUBLICATIONS

Screen captures from YouTube video clip entitled "Stoelting F231 assembly after cleaning" 2 pages, uploaded on Apr. 16, 2018 by user "Slices Concession". Retrieved from Internet: <https://www.youtube.com/watch?v=f-ZXqwzADrg>. (Year: 2018).*

Screen captures from YouTube video clip entitled "SF144 I2 Cleaning Instructions" 2 pages, uploaded on Apr. 16, 2018 by user "Stoelting Frozen Treat Equipment". Retrieved from Internet: <https://www.youtube.com/watch?v=Bhm3LpioSU4>. (Year: 2018).*

Screen captures from YouTube video clip entitled "Stoelting U431-A—Cabinet Operation" 2 pages, uploaded on Jan. 26, 2017 by user "Stoelting Frozen Treat Equipment". Retrieved from Internet: <https://www.youtube.com/watch?v=IYPzJzCDxig>. (Year: 2017).*

Screen captures from YouTube video clip entitled "Stoelting U431-A—Cabinet Maintenance" 2 pages, uploaded on Jan. 26, 2017 by user "Stoelting Frozen Treat Equipment". Retrieved from Internet: <https://www.youtube.com/watch?v=9QTZK29gS3Y>. (Year: 2017).*

Stoelting Model U431operators manual [online], [retrieved on Apr. 20, 2020]. Retrieved from the Internet <URL:http://stoelting.us/PDFs/FloorPressureFed/U431%20Owner%27s%20Manual%20Serial%20nos%200-17977.pdf> (Year: 2002).*

Stoelting Model U431 12 operators manual [online], [retrieved on Apr. 20, 2020]. Retrieved from the Internet <URL:https://stoeltingfoodservice.com/resources/15168/513660.pdf?resourceType=Resource> (Year: 2013).*

Stoelting, A Vollrath Company, Model F231 Operators Manual, 2016, 29 pages.

* cited by examiner

FROZEN FOOD PRODUCT DISPENSING MACHINE INCLUDING MIXING MANIFOLD

CROSS-REFERENCE TO RELATED PATENT APPLICATIONS

This application claims the benefit of U.S. Provisional Application No. 62/411,866, filed Oct. 24, 2016, which is incorporated herein by reference in its entirety.

BACKGROUND

The present invention relates generally to the field of frozen food product dispensing machines.

Frozen food product dispensing machines are used to dispense soft confectionary food products such as aerated ice cream, custard, frozen yogurt, sherbets, sorbets, or other similar frozen food products. A storage hopper, bag, or other reservoir holds a liquid form of the desired food product. Air and the liquid are drawn into a freezing chamber where they are mixed and cooled to form the aerated frozen food product that is commonly referred to as a "soft-serve" frozen food product.

SUMMARY

One embodiment of the invention relates to a frozen food product dispensing machine including a housing, a freezer barrel disposed within the housing, a plurality of drawers, and a manifold comprising a plurality of inlets and one outlet. The plurality of drawers are disposed within and slidably coupled to the housing and configured to each support a liquid food product mix reservoir. The inlets are each fluidly coupled to one of the liquid food product mix reservoirs, and the outlet is fluidly coupled to the freezer barrel to supply liquid food product mix from all of the liquid food product mix reservoirs to the freezer barrel.

Another embodiment of the invention relates to a frozen food product dispensing machine, including a housing, a freezer barrel disposed within the housing, a plurality of drawers, a pump, a pressure sensor coupled directly to the freezer barrel, and a controller. The plurality of drawers are disposed within and slidably coupled to the housing and configured to each support a liquid food product mix reservoir. The pump is configured to provide air and liquid food product mix to the freezer barrel. The pressure sensor is configured to detect the pressure within the freezer barrel. The controller is configured to stop operation of the pump when the detected pressure exceeds a predetermined threshold pressure.

Another embodiment of the invention relates to a frozen food product dispensing machine including a housing, a freezer barrel disposed within the housing, a plurality of drawers, and a plurality of coiled flexible hoses, each hose biased to a retracted coiled position. The plurality of drawers are disposed within and slidably coupled to the housing and configured to each support a bag configured to contain liquid food product mix. Each bag includes a coupling configured to allow the liquid food product mix to exit the bag. Each hose is attached to the coupling of the one the bags. Each hose extends when the drawer supporting the bag is moved to an open position. Each hose biases to the retracted coiled position to bias the drawer to move from the open position toward a closed position.

Alternative exemplary embodiments relate to other features and combinations of features as may be generally recited in the claims.

DETAILED DESCRIPTION

Figure 1:
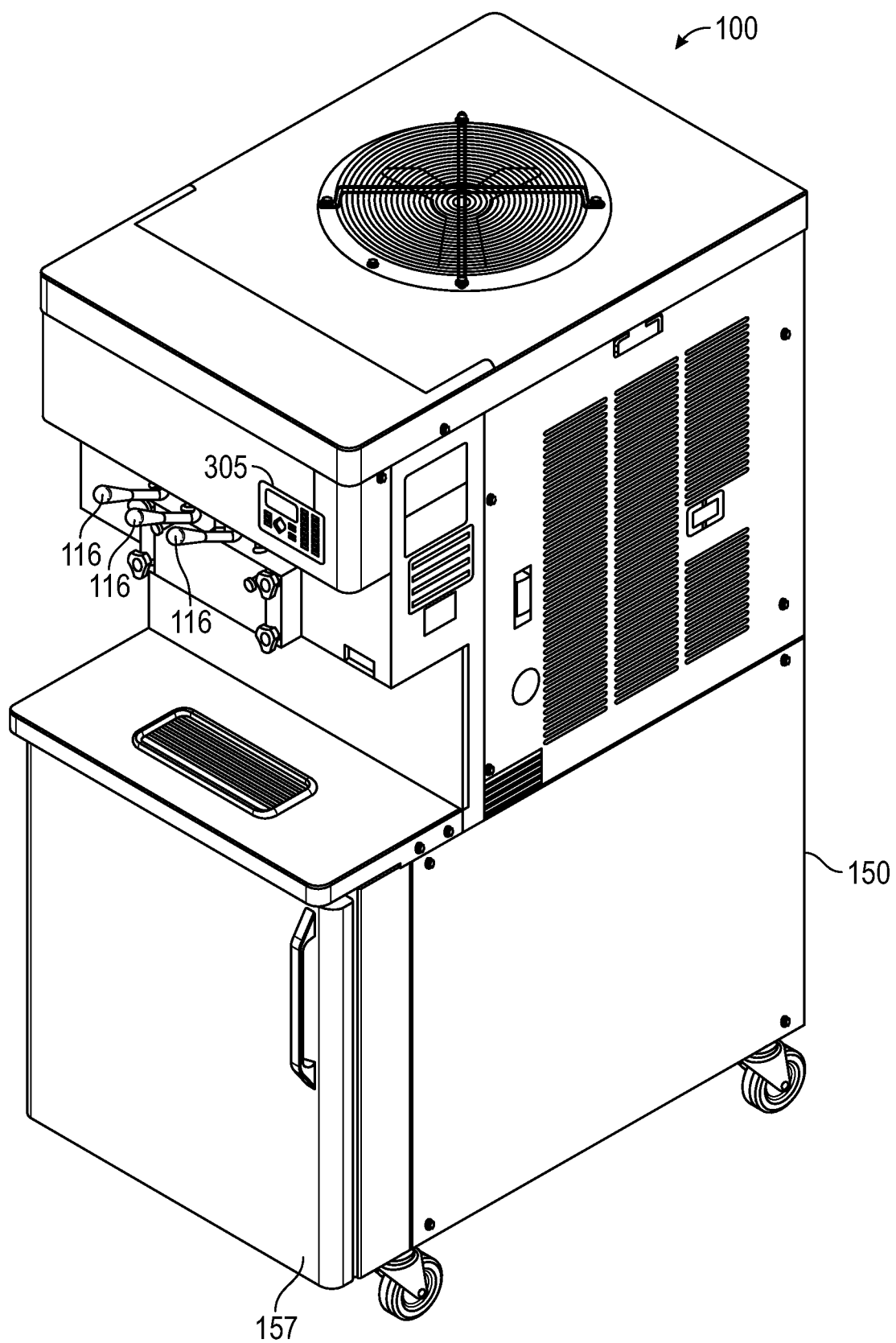
FIG. 1 is a perspective view of a frozen food product dispensing machine, according to an exemplary embodiment.
Figure 2:
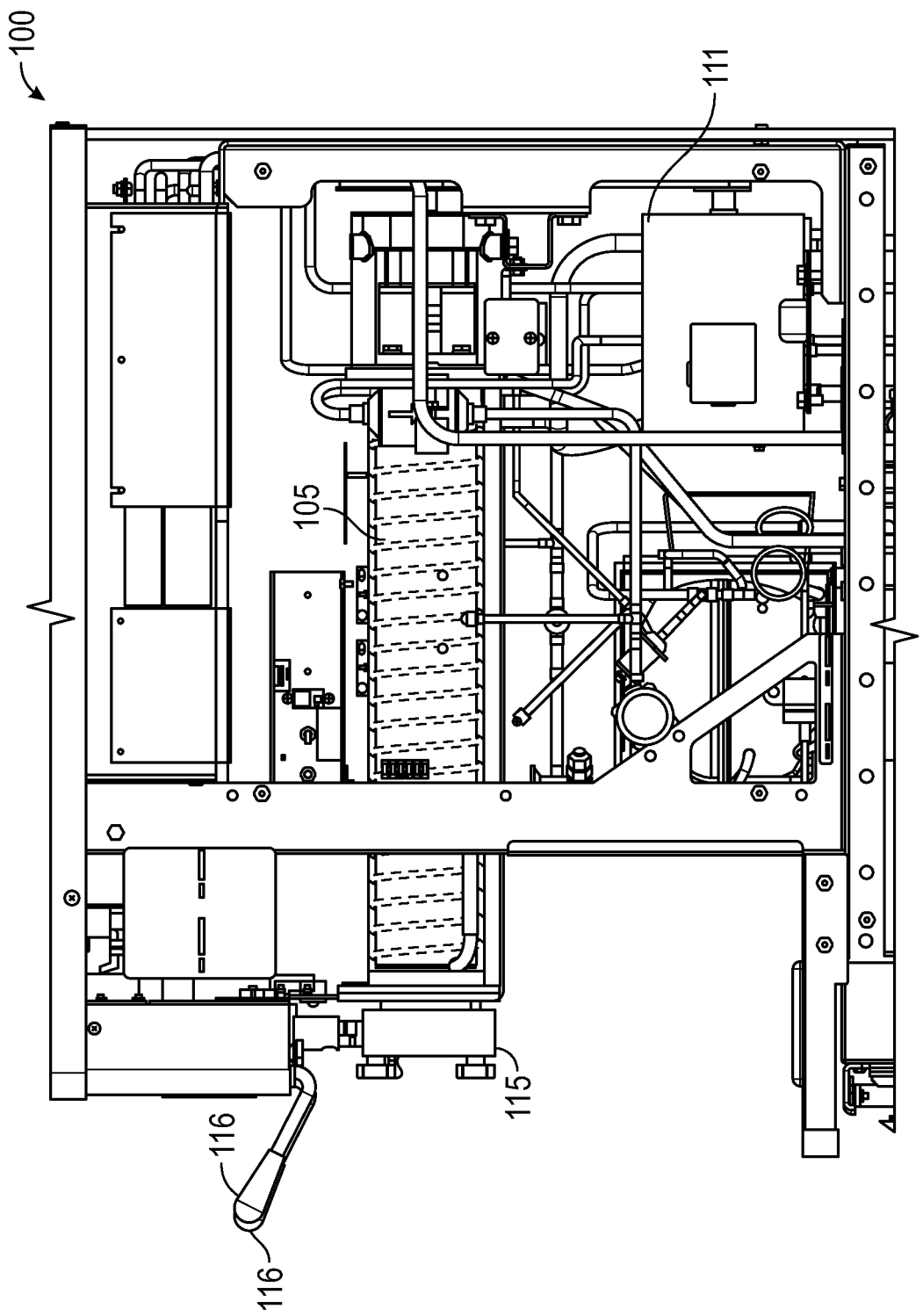
FIG. 2 is a side view of the frozen food product dispensing machine of FIG. 1.
Figure 3:
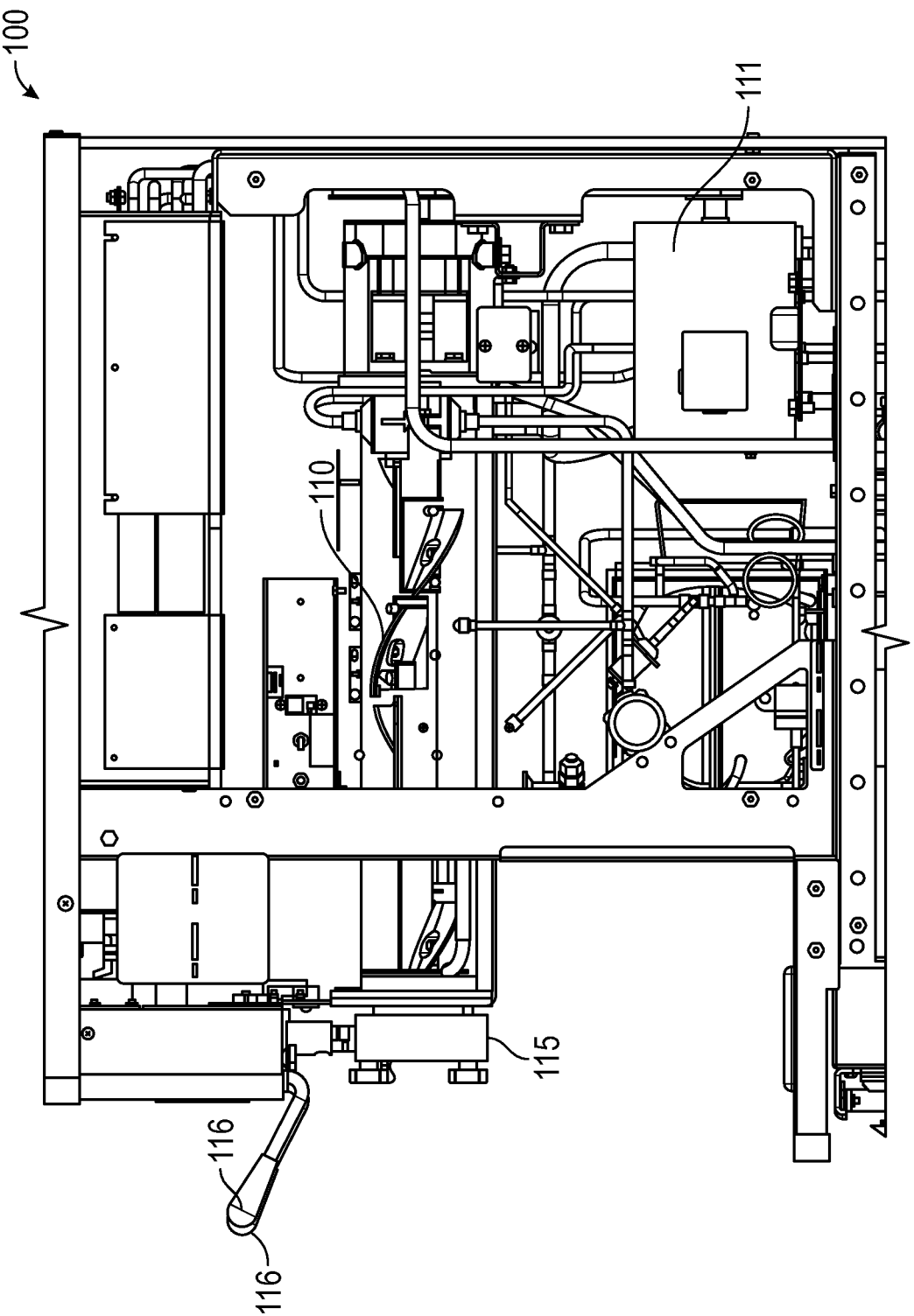
FIG. 3 is another side view of the frozen food product dispensing machine of FIG. 1.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-4, a frozen food product dispensing machine, shown as dispensing machine 100, includes a plurality of freezer cylinders or freezer barrels 105. In some embodiments, each freezer barrel 105 includes a horizontally elongated cylinder enclosing a cylindrical freezing chamber and having an inner wall that is cooled by refrigeration ducts. The freezer barrel 105 contains a blending element (e.g., an auger type blender), shown as auger 110, for agitating and aerating a mixture within the freezing chamber. The auger 110 is driven by one or more motors 111. A dispensing nozzle or spigot 115 is fluidly connected to each of the freezer barrels 105 for dispensing frozen food product from the respective freezer barrel 105. A third spigot 115 may be fluidly connected to two freezer barrels 105 to dispense a mixture of the frozen food products from the two freezer barrels 105 (e.g., "twist" soft-serve including both vanilla and chocolate soft serve). The flow through each spigot 115 can be controlled by the user using a user interface device (e.g., a button, a lever, etc.), shown as lever 116. Dispensing machine 100 also includes a housing 150 to provide structure for and contain the various components of the machine 100.

Figure 5:
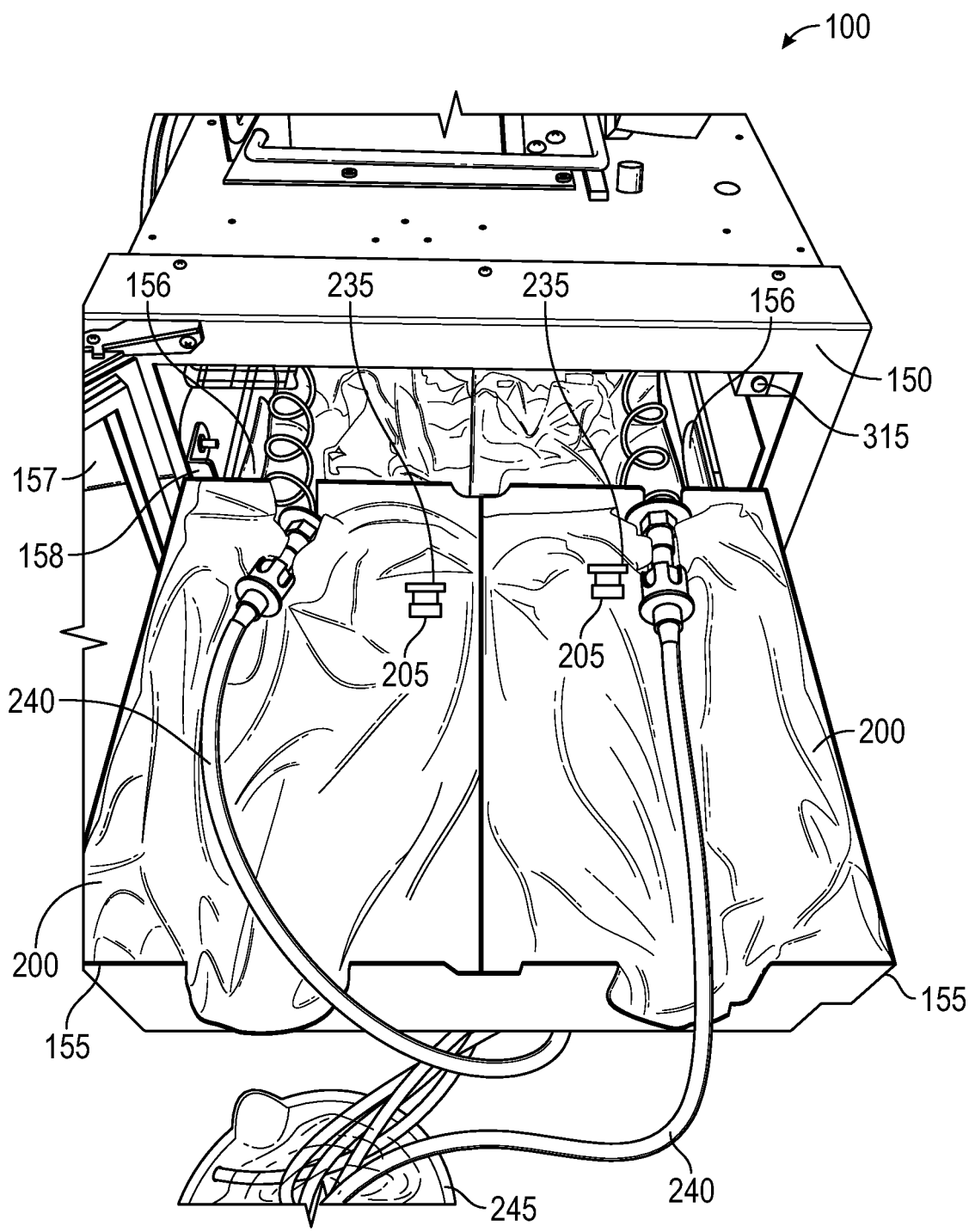
FIG. 5 is a perspective view of bags of the frozen food product dispensing machine of FIG. 1, according to an exemplary embodiment.

A liquid food product mix (e.g., soft serve ice cream mix, frozen yogurt mix, etc.) is frozen by the dispensing machine 100 to create a frozen food product that is dispensed to a customer. As illustrated in FIG. 5, the user provides the mix in a liquid food product mix reservoir or container, shown as bag 200. Alternatively, the liquid food product mix reservoir may be a reusable container (e.g., a trough, a bucket, a hopper, etc.) into which the user pours the mix. A user may combine a flavored powder with a liquid (e.g., water) to create the mix or provide a premade mix. In some embodiments, the bag 200 is supplied to the user filled with premade mix, and the bag 200 is disposable.

Figure 4:
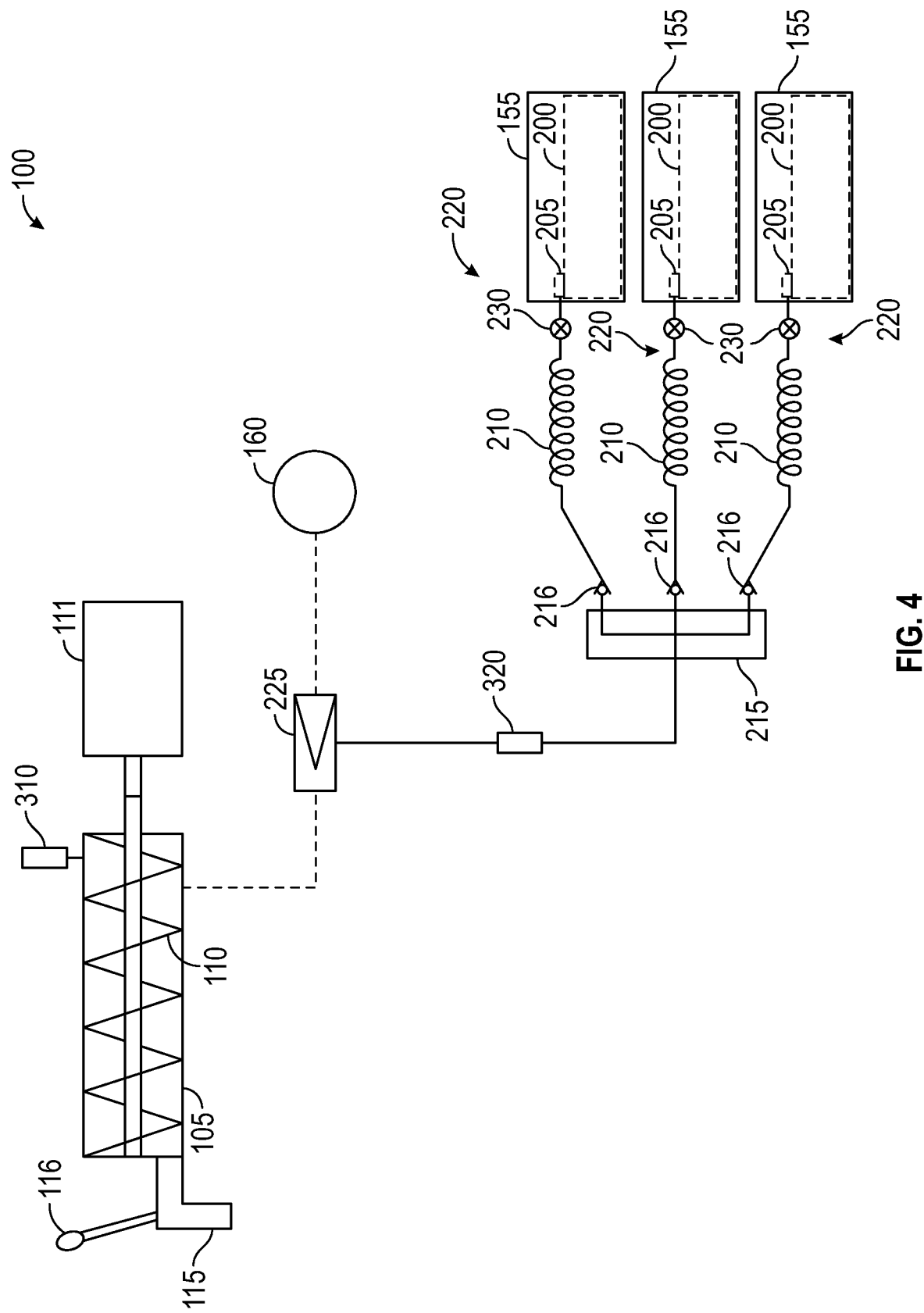
FIG. 4 is a schematic view of the frozen food product dispensing machine of FIG. 1 in an operating configuration.

FIG. 4 illustrates the connection of multiple bags 200 to one of the freezer barrels 105. It should be understood that each freezer barrel 105 may be similarly connected to another set of bags 200. Each bag 200 has an interface (e.g., a fill neck or a hole cut in the bag 200), shown as coupling 205, configured to fluidly couple the bag 200 to the dispensing machine 100. Each coupling 205 is fluidly coupled to a fluid conduit, shown as hose 210. The hoses 210 are flexible and each include a fitting at one end configured to connect to a coupling 205 without leaking (e.g., a sleeve that slides over a fill neck on the bag 200, a threaded fitting that tightens onto a corresponding thread on the coupling 205, etc.). In some embodiments, this connection between the coupling 205 and the hose 210 requires no tools to assemble. The end of each hose 210 opposite the corresponding bag 200 is fluidly coupled to a manifold 215.

Figure 6:
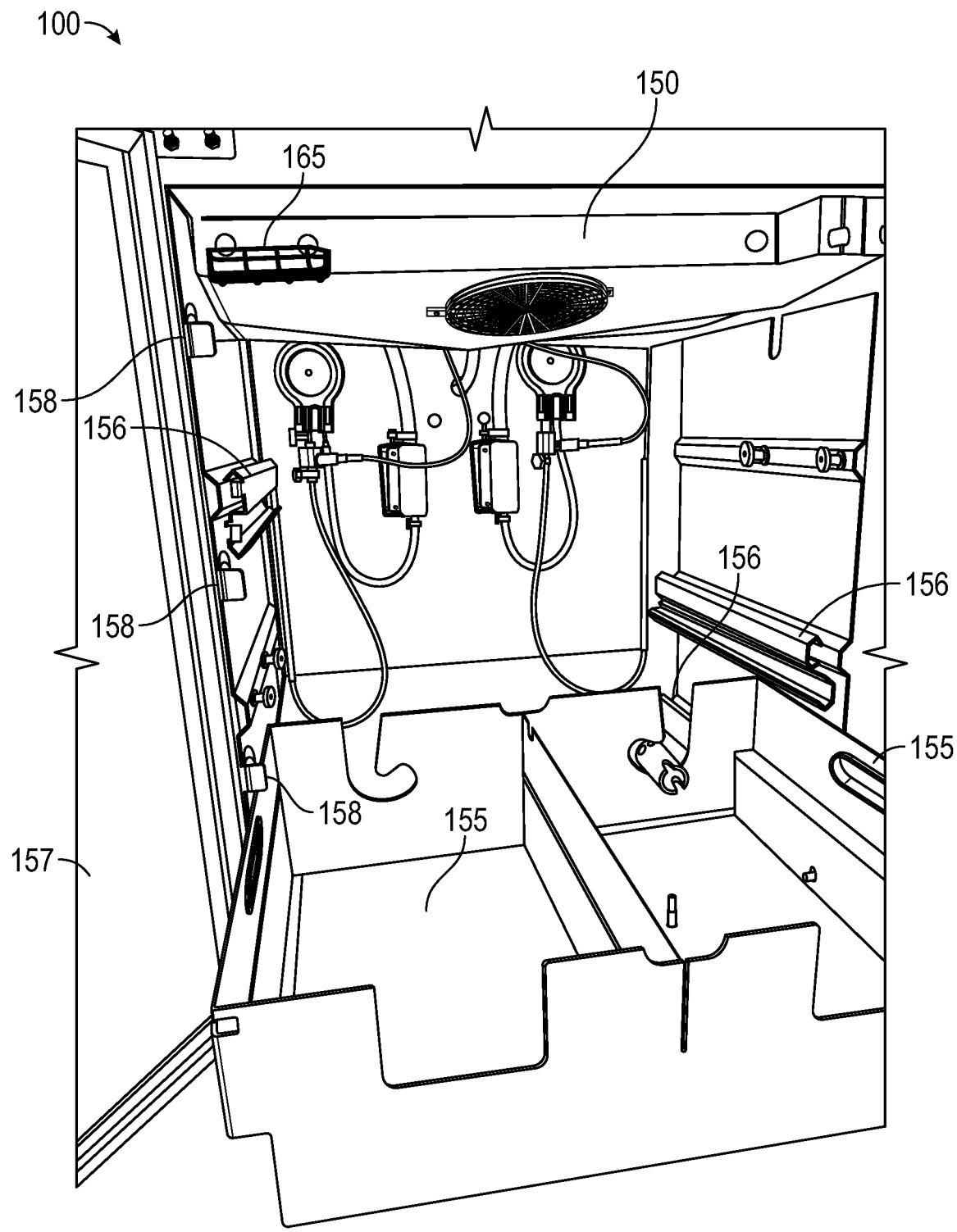
FIG. 6 is a perspective view of the inside of the frozen food product dispensing machine of FIG. 1, according to an exemplary embodiment.

Referring to FIGS. 5 and 6, the machine 100 includes drawers 155 each configured to support one or more bags 200 placed inside of the drawer 155. Each drawer 155 is slidably coupled to the housing 150 by a sliding mechanism 156 (e.g., drawer slides) such that it can easily be manipulated (e.g., pushed or pulled) by the user between a closed position disposed within the housing 150 and an open position disposed at least partially outside the housing 150. While inside of the housing 150, the drawers 155 and the bags 200 are cooled to a desired temperature by a refrigeration system (e.g., the refrigeration system that cools the freezer barrel 105, a separate refrigeration system, etc.). Cooling the mix inside the drawers 155 keeps the mix from spoiling and brings the mix closer to its freezing point. The housing 150 provides a cavity, cutout, or indentation into which the drawers 155 can slide (e.g., while in the closed position). In the open position, each drawer 155 supports the corresponding bags 200 while the user attaches the hoses 210 to the corresponding couplings 205. Because the drawer 155 slides the bag 200 out into the open area external to the housing 150, the user is able to interact with the bags 200 without obstruction from the housing 150. Once the hoses 210 are connected, the user can slide the drawers 155 so that they are partially or fully inside the housing 150 (e.g., in the closed position) to reduce the overall envelope of the machine 100 and protect the bags 200 from dust or other outside contaminants. In the exemplary embodiment shown in FIG. 7, the drawers 155 slide fully inside the housing 150 in the closed position. A door 157 rotatably coupled to the housing 150 selectively moves between an open position and a closed position. In the closed position, the door 157 seals against the housing 150 to enclose the drawers 155 and the bags 200 within the housing 150, preventing access to the drawers 155 and preventing movement of the drawers 155. In the open position, the door 157 allows access to the drawers 155 and allows movement of the drawers 155. In an alternative embodiment, the door 157 is omitted, and the drawers 155 seal against the housing 150 when in the closed position to prevent any refrigerated air from escaping.

Figure 8:
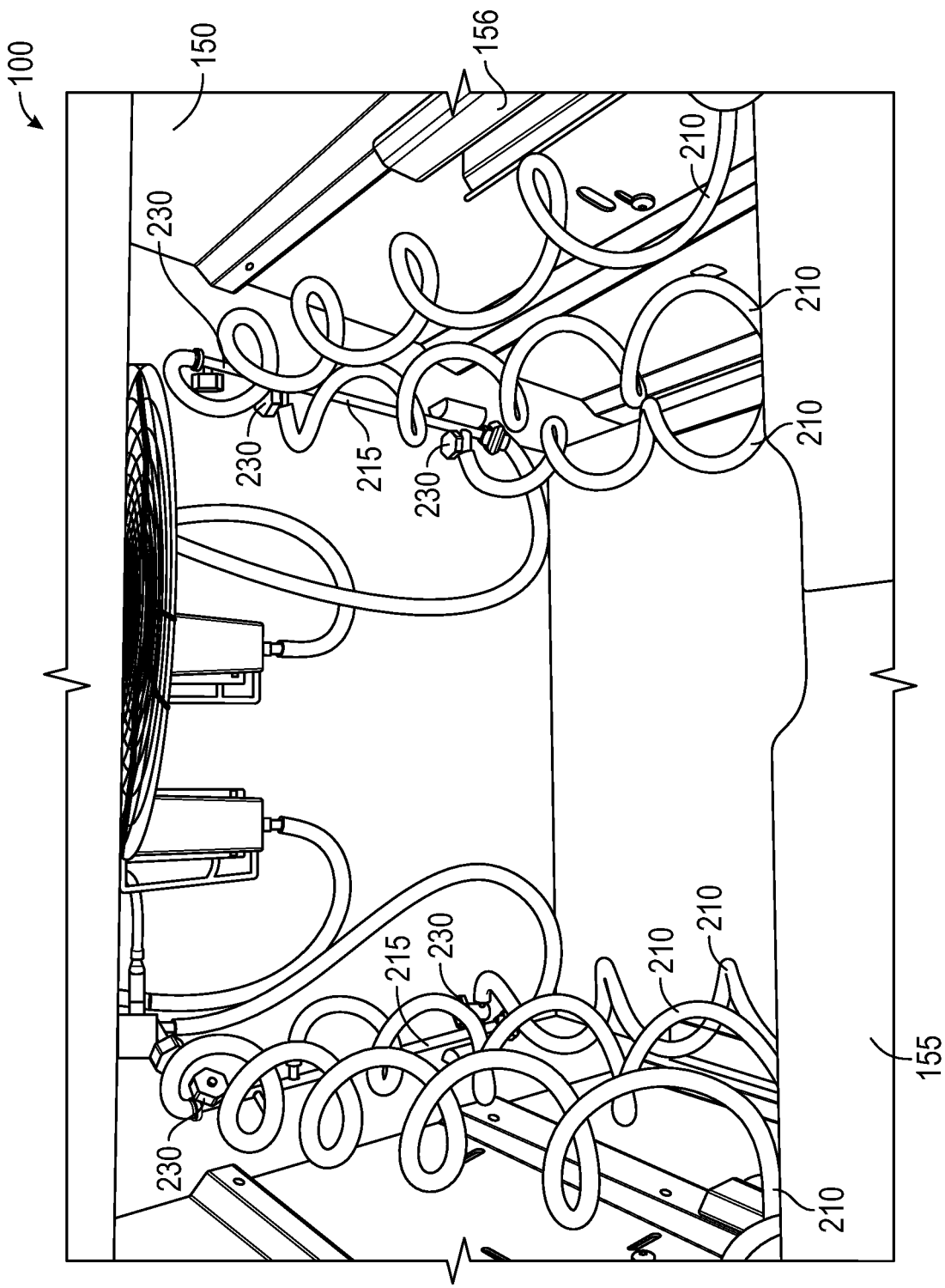
FIG. 8 is another perspective view of the inside of the frozen food product dispensing machine of FIG. 1.

According to the exemplary embodiment shown in FIG. 8, the hoses 210 are flexible and formed into a coiled or spiral shape. The coiled shapes of the hoses 210 bias each hose into a retracted coiled position. As shown in FIG. 8, the hoses 210 are located between the corresponding drawer 155 and an inside wall of the housing 150. The coiled shape allows the hoses 210 to expand or contract to stay out of the path of the drawers 155 as the drawers 155 slide in and out of the housing 150. The hoses 210 may be fully or nearly fully retracted into their respective retracted coiled positions when the corresponding drawer 155 is in the closed position. When the drawer 155 is pulled out toward the open position, the corresponding hoses 210 stretch from their respective retracted coiled positions by the distance moved by the drawer 155. With a drawer 155 in the open position, the corresponding hoses 210 bias the drawer 155 toward the closed position. Because the hoses 210 stay behind the drawers 155 due to their coiled shapes, the hoses 210 avoid being caught between the drawers 155 and other components of the machine 100.

Referring again to FIGS. 6 and 7, in some embodiments the machine 100 includes one or more latches or catches 158 rotatably coupled to the inside of the housing 150 above each drawer 155. Each catch 158 is paired to a drawer 155 and is positioned near the paired drawer 155. Each catch 158 can be rotated up into a retracted position and down into an extended position. In the retracted position, a catch 158 does not contact the paired drawer 155, allowing the drawer 155 to translate freely. When the drawers 155 are in the extended position, the user can rotate the catches 158 down to an extended position where the catches 158 extend behind the drawer 155 to prevent the drawer 155 from closing (e.g., by preventing the coiled hose tension from pulling the drawer 155 closed). When closing the drawer 155, the catch 158 works in reverse. The user can move the catch 158 to the retracted position to allow the drawer 155 to close. The user can move the catch 158 to the extended position in front of the drawer 155 once the drawer 155 is in the retracted position to prevent the drawer 155 from sliding open and interfering with operation of the door 157. Alternatively, the catches 158 may be configured such that the catches 158 automatically move to the retracted position when the paired drawer 155 is moved toward the open position.

Referring again to FIG. 4, the combination of a bag 200, a coupling 205, a hose 210, and a portion of a drawer 155 that supports the bag 200 make up a feeding assembly 220. In some embodiments, the feeding assembly 220 includes a different type of container for the liquid mix (e.g., a hopper) instead of the bag 200 and coupling 205. The machine 100 includes a plurality of feeding assemblies 220. Each bag 200 contains one flavor of mix. According to an exemplary embodiment, the machine 100 has at least one feeding assembly 220 per freezer barrel 105. The addition of multiple feeding assemblies 220 connected to each freezer barrel 105 allows the machine 100 to dispense more frozen food product prior to the user having to add more mix to the machine 100. In an exemplary embodiment, the machine 100 contains two freezer barrels 105 and six feeding assemblies 220. Three feeding assemblies 220 each contain bags 200 with one flavor of mix which feed into one freezer barrel 105, and three other feeding assemblies 220 each contain bags 200 with a different flavor of mix that feed into the other freezer barrel 105. Each drawer 155 may contain one or more bags 200. By way of example, each drawer 155 may contain one bag 200 containing mix of a first flavor and another bag 200 containing mix of a second flavor.

In order to fluidly couple multiple bags 200 to the same freezer barrel 105, one or more manifolds 215 are provided. As shown in FIG. 4, one manifold 215 is paired with each freezer barrel 105. As shown schematically in FIG. 4, the manifold 215 includes an outlet and multiple inlets each fluidly coupled to one of the feeding assemblies 220 associated with a particular freezer barrel 105. The mix flows into the manifold 215 from the bags 200 though the inlets, mixes together within the manifold 215, and passes out through the outlet toward the corresponding freezer barrel 105. In some embodiments, the manifold 215 is made of stainless steel, but in other embodiments the manifold 215 is made of other materials (e.g., food safe plastic). As shown in an exemplary embodiment in FIG. 4, one or more check valves 216 may be connected between the manifold 215 and one or more of the bags 200. The check valves 216 allow the user to connect less than the maximum number of bags 200 without any fluid leaking from the manifold 215 through the unused inlets. For example, if the machine 100 has the capacity to connect three bags 200 to the manifold 215, but the user connects only two bags 200, the check valve 216 prevents any fluid flowing out of the unused input to the manifold 215. The check valves 216 also prevent any fluid flowing from one of the bags 200 into another of the bags 200, which could otherwise cause new mix to be contaminated with old mix.

Referring again to FIG. 4, the outlet of each manifold 215 is fluidly coupled (e.g., by a rigid pipe) to a valve, shown as mixing valve 225, that mixes the incoming mix with a quantity of air. Combining air and the mix before the mix is fully frozen prevents the mixture from freezing solid inside the machine 100 and gives the frozen food product a desirable texture. Air is pressurized by a pump 160 and flows into the mixing valve 225. In some embodiments, the mixing valve 225 utilizes the Venturi effect by passing the pressurized air through a nozzle to entrain liquid mix into the flow of air. The outlet of the manifold 215 is fluidly coupled to the mixing valve 225 such that the low pressure created by the air passing through the mixing valve 225 draws the liquid mix into the mixing valve 225 where it mixes with the air. Accordingly, the low pressure generated by the pump 160 and the mixing valve 225 may draw the mix from the feeding assemblies 220. The outlet of the mixing valve 225 is fluidly coupled to one of the freezer barrels 105. In embodiments that include more than one freezer barrel 105, each freezer barrel is coupled to a separate mixing valve 225. However, a single pump 160 may supply pressurized air to all of the mixing valves 225. The pressure created by the mixing valve 225 causes the mixture of air and mix to flow into the freezer barrel 105, where it begins to solidify. The auger 110 in the freezer barrel 105 continuously rotates, agitating the mixture. The auger 110 ensures that the mixture does not freeze completely solid by scraping it off the wall of the freezer barrel 105 and by continuously mixing the air and the mix. In some embodiments, the shape of the auger 110 (e.g., a spiral) forces the mixture towards the end of the freezer barrel 105 nearest the spigot 115. This ensures that the freezer barrel 105 can be emptied as completely as possible. The freezing process happens gradually as the liquid mixture flows down the length of the freezer barrel 105. Additionally, the agitating action of the auger 110 mixes the liquid mixture with the frozen mixture, creating a more uniform end product.

Figure 9:
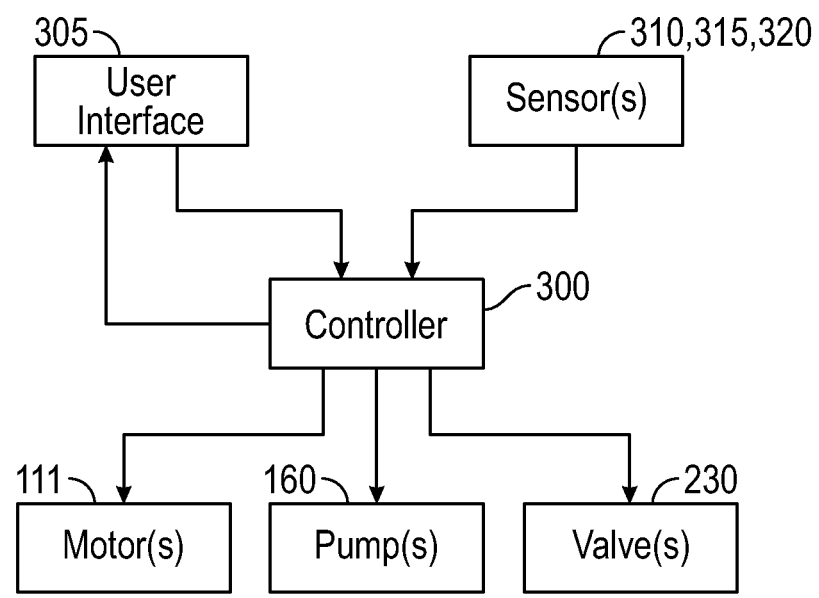
FIG. 9 is a flowchart illustrating the flow of information throughout the frozen food product dispensing machine of FIG. 1, according to an exemplary embodiment.

The dispensing machine 100 includes a programmable controller 300 that receives information from a series of sensors and a user interface 305 and issues commands to other parts of the dispensing machine 100 (e.g., to control the speed of the motors 111, to switch pump 160 on or off, to control the refrigeration system, etc.). FIG. 9 illustrates the flow of information (e.g., sensor information, commands, etc.) throughout the machine 100. The programmable controller 300 may include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to processor via processing circuit and includes computer code for executing (e.g., by processing circuit and/or processor) one or more processes described herein. The programmable controller 300 communicates with other parts of the dispensing machine 100 using a wired or wireless connection.

Figure 10:
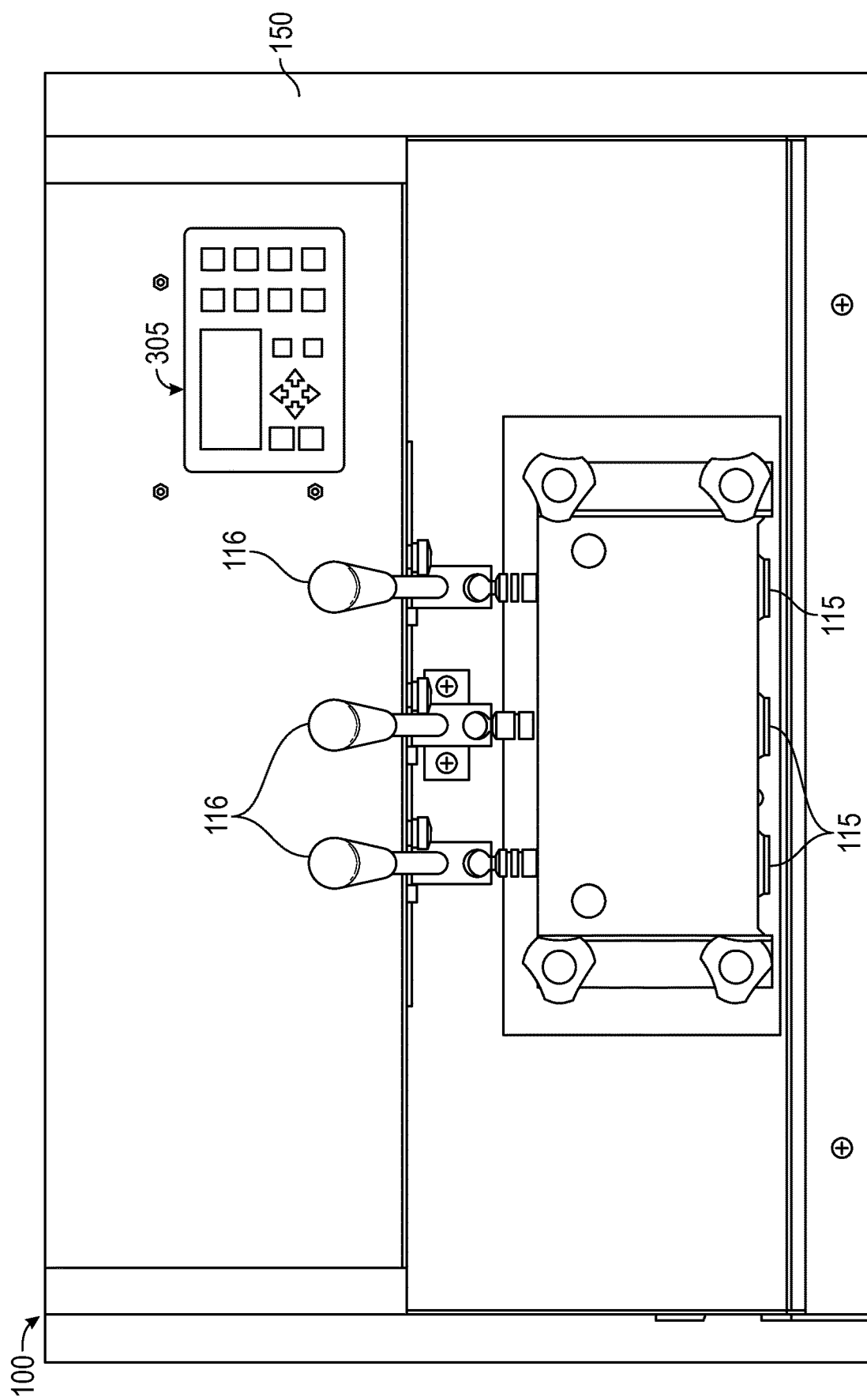
FIG. 10 is a front view of the frozen food product dispensing machine of FIG. 1.

Referring to an exemplary embodiment shown in FIG. 10, the dispensing machine 100 includes a user interface 305 that displays information to the user and receives control inputs from the user. In some embodiments, the user interface 305 includes a display screen and one or more user input devices (e.g., switches, buttons, key-switches, dials, etc.). In some embodiments, the display screen is a touch screen display that both displays information to the user and receives user inputs. In other embodiments, the user interface 305 includes only a series of lights or no display at all. The user interface 305 may be coupled to the housing 150 or located remote from the housing 150. In some embodiments, the user interface 300 includes a separate device remote from the housing 150 (e.g., such that the user interacts with the controller 300 through an application installed onto a computer, smartphone, tablet, or other device). By way of example, the user interface 305 may include a smartphone, and the smartphone may provide notifications to a user or receive commands from a user. In some embodiments, the user interface 305 provides the user with information related to the operation of the dispensing machine 100. For example, the user interface 305 may indicate whether the temperature or pressure of the food product are within acceptable ranges, whether the machine 100 is powered on, which bags 200 are empty, if the dispensing machine 100 needs maintenance, whether or not the machine 100 is level enough for operation, etc. The user interface 305 can also receive inputs from the user to control the dispensing machine 100. For example, the user could interact with the user interface 305 to select between desired temperature ranges, issue run or stop commands for normal operation or a cleaning mode, power the machine 100 on and off, or cycle through which information is displayed on the screen.

Referring again to FIG. 4, the dispensing machine 100 includes one or more pressure sensors 310 connected to the controller 300. Each pressure sensor 310 provides information to the controller 300 relating to a pressure within one of the freezer barrels 105. The pressure sensor 310 may include a pressure transducer capable of providing information relating to a spectrum of different pressures or may include one or more pressure switches that provide information relating to whether a measured pressure is above or below a certain threshold. The pressure sensor 310 may be located on and/or coupled to the freezer barrel 105, the pump 160, or some point in between. In a preferred embodiment, the pressure sensor 310 is directly connected to the freezer barrel 105. This provides the most accurate representation of the pressure inside the barrel 105 and removes the need for any extra connection materials (e.g., hoses and fittings) that might be required in order to put it elsewhere. During operation, the pressure in the freezer barrel 105 is maintained (e.g., using the pump 160) within a certain predetermined pressure range (e.g., between 18 psi and 24 psi gauge pressure) using the pressure within the freezer barrel 105 detected by the pressure sensor 310. If the pressure drops below a predetermined low threshold pressure, the pressure in the barrel 105 which is used to force the product out of the spigots 115 will no longer be enough to force the product out at the desired rate. If the pressure exceeds a predetermined high threshold pressure, there is likely too much mixture in the barrel 105 for the machine 100 to operate as intended. The pressure sensor 310 is configured to detect if the pressure within the freezer barrel 105 falls outside of the predetermined range (e.g., defined between the predetermined low threshold pressure and the predetermined high threshold pressure). After receiving the pressure information from the pressure sensor 310, the controller 300 may be configured to selectively power the pump 160 on if the pressure detected by the pressure sensor 310 falls below the predetermined low threshold pressure or off if the detected pressure exceeds the predetermined high threshold pressure. This starts or stops the flow of mixture into the barrel 105 which directly affects the pressure.

Referring again to FIG. 5, in some embodiments, the dispensing machine 100 includes one or more sensors (e.g., switches, buttons, hall effect sensors, etc.), shown as switches 315, positioned near the drawers 155 and/or any doors or access hatches (e.g., the door 157) that are included on the housing 150. These switches 315 detect when the door 157 or a drawer 155 is open or closed. Unintentionally leaving a drawer 155 or the door 157 open could lead to the mix exceeding a desired temperature. An indication from the switch 315 that the door 157 is open may also be used to turn on a light to facilitate sight within the housing 150. In some embodiments, the switches 315 send a signal back to the controller 300 when the door 157 is open, which in turn alerts the user through the user interface 305. In other embodiments, the switch 315 is directly connected to a light or buzzer. In this case, opening the door 157 or a drawer 155 completes the circuit and activates the light or buzzer.

Figure 11A:
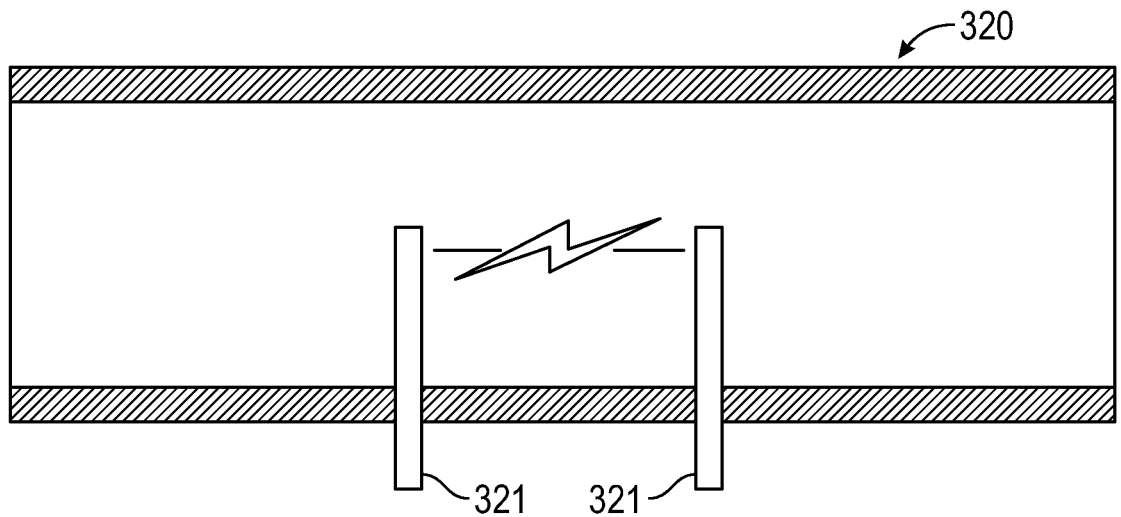
FIG. 11A is a section view of an air sensor of the frozen food product dispensing machine of FIG. 1, according to an exemplary embodiment.
Figure 11B:
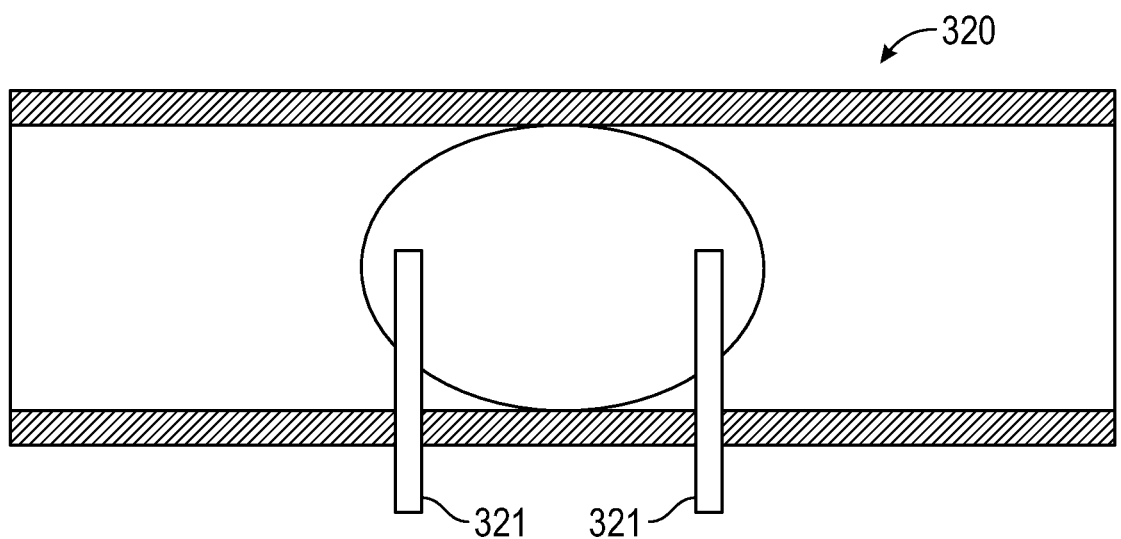
FIG. 11B is another section view of the air sensor of FIG. 11A.

Referring to FIG. 4, the machine 100 includes a sensor (e.g., an air sensor, a fluid sensor, an ohmmeter, a mix sensor, an ammeter, etc.), shown as air sensor 320, in communication with the controller 300. The air sensor 320 is configured to determine if there is a constant stream of mix or if there are any pockets of gas (e.g., air, etc.) within the stream of mix. In one embodiment, the air sensor 320 includes two contacts 321 that enter into the flow path of the mix. The air sensor 320 is configured to apply a small voltage across the contacts 321. If a steady stream of mix (e.g., a stream of mix interspersed with a small volume of gas or no gas) extends between the two contacts 321, the mix conducts electricity between the contacts 321 with a relatively small resistance, as shown in FIG. 11A. If the air sensor 320 measures a current between the contacts 321 indicative of such a small resistance, the air sensor 320 is configured to provide a first signal to the controller 300. If an unsteady stream of mix (e.g., a stream of mix interspersed with a large volume of gas, a stream of gas with a small volume of mix, etc.) extends between the two contacts 321, then the gas pockets insulate the two contacts 321 from each other (e.g., connect the contacts 321 with a relatively high resistance), as shown in FIG. 11B. If the air sensor 320 measures a current indicative of such a high resistance, the air sensor 320 is configured to provide a second signal to the controller 300 different from the first signal. The sensitivity of this mechanism can be adjusted by changing the distance between the contacts 321. The farther apart the contacts 321 are from each other, the more potential there is for one or more gas pockets to extend between the two contacts 321. In the exemplary embodiment shown in FIG. 4, the air sensor 320 is placed in line between a manifold 215 and the corresponding mixing valve 225. In other embodiments, an air sensor 320 is placed in each feeding assembly 220 between a bag 200 and the corresponding manifold 215. The latter arrangement requires a greater number of air sensors 320, but provides individualized information about the flow of mix from each bag 200.

The presence of pockets of gas may indicate that the mix source (e.g., a bag 200 or other container) is not providing a steady supply of mix. A short period of time (e.g., between 0.1 and 1 second) with a high-resistance connection between the two contacts 321 (e.g., indicated by the second signal) may indicate that there are small bubbles caused by a depleted supply of mix and one or more bags 200 should be changed soon. In this instance, the controller 300 may be configured to command the user interface 305 to provide a notification to the user (e.g., a "check mix" light, message, or alarm, a text message or notification on a smart phone, etc.) indicating that one or more of the bags 200 are depleted (e.g., completely empty or nearly empty) and that the bag 200 should be replaced soon. The amount of time with a high-resistance connection required to trigger this condition may have a minimum value (e.g., at least 0.5 seconds, at least 1 second, etc.). This avoids sending an errant reading due to noise in the signal. A long period of time (e.g., greater than 3 seconds) with a high-resistance connection may indicate that there is not enough mix incoming to continue operation as desired. The controller 300 may indicate this to the user through the user interface 305 (e.g., by a "mix empty" or "change mix" light, message, or alarm).

In some embodiments, such as the embodiment shown in FIG. 4, the air sensor 320 is located between a manifold 215 and the corresponding freezer barrel 105 (i.e., the contacts 321 are disposed at least partially within a flow path between a manifold 215 and the corresponding freezer barrel 105). In such embodiments, a high-resistance connection between the contacts 321 for a long period of time may indicate that the all of the bags 200 connected to one of the freezer barrels 105 are out of mix, and the controller 300 may cease operation of that portion of the machine 100 (e.g., the corresponding freezer barrel 105 and pump 160, etc.) and alert the user (e.g., through the user interface 305). In other embodiments, an air sensor 320 is located between each of the bags 200 and the corresponding manifold 215 (i.e., the contacts 321 are disposed at least partially within a flow path between each of the bags 200 and corresponding manifold 215). In such embodiments, a high-resistance connection between the contacts 321 for a long period of time may indicate that the bag 200 corresponding to the air sensor 320 is empty.

In some embodiments, the dispensing machine 100 includes one or more valves, shown as shut-off valves 230. The shut-off valves 230 are each fluidly connected between the one of the bags 200 and the corresponding manifold 215. The shut-off valves 230 may be separate from the manifold 214 or incorporated into the manifold 215. The shut-off valves 230 selectively fluidly decouple a bag 200 from the corresponding manifold 215. In an open position (e.g., a configuration where a valve element of the shut-off valve 230 is in an open position), the shut-off valves 230 each fluidly couple the corresponding bag 200 to the manifold 215. In a closed position (e.g., a configuration where a valve element of the shut-off valve 230 is in a closed position), the shut-off valves 230 each fluidly decouple the corresponding bag 200 from the manifold 215. The shut-off valves 230 may be manual valves (e.g., that can be operated by the user) or electronically operated valves (e.g., solenoid valves) that are controlled by an electronic controller (e.g., the controller 300). If the valves are electronic, the controller 300 may close a shut-off valve 230 between a bag 200 and the corresponding manifold 215 in response to a signal from the air sensor 320 indicating that the bag 200 is empty or nearly empty.

Conventional frozen food product dispensing machines can only draw mix from one reservoir to each freezer barrel. This means that when a conventional dispensing machine is running low on mix, the reservoir must be refilled or swapped out. When a reservoir is filled or exchanged, the new mix requires time to reach the proper temperature to provide frozen food product of a desired texture from the freezer barrel. If the user does not wait long enough for the mixture to freeze after refilling the reservoir in the conventional system, the food product may not be solid enough to achieve the desired texture. The ability to have multiple bags 200 loaded into the machine 100 at one time allows the user to draw out of each bag 200 separately or at different rates such that the bags 200 become empty at different times. This allows the user to change one empty bag 200 while one or more other bags 200 are still in use, eliminating or reducing any down time that would conventionally be required while refilling or exchanging reservoirs.

According to the exemplary embodiment shown in FIGS. 7 and 8, each of the bags 200 connected to the same manifold 215 are arranged above and below each other. In such an embodiment, if the bags 200 are simultaneously fluidly coupled to the manifold 215, gravity acting on the fluid in the bags 200 causes the upper-most bag 200 to empty fastest and the lower-most bag 200 to empty slowest. The shut-off valves 230 allow the user and/or the controller 300 to selectively connect and disconnect the bags 200 from the manifold 215. For example, the user could designate one bag 200 as a "reserve" that only is drawn from after the others are empty, allowing the user to switch over to the reserve bag 200 while changing the empty bags 200. In such an example, the controller 300 may control the operation of the shut-off valves 230 in response to information from the air sensors 320. As the air sensors 320 indicate that all of the non-reserve bags 200 corresponding to a freezer barrel 105 are empty, the shut-off valves 230 may fluidly decouple the non-reserve bags from the corresponding manifold 215 and fluidly couple the reserve bag 200 to the corresponding manifold 215. Alternatively, the controller 300 may indicate to the user (e.g., through the user interface 305) that the shut-off valves 230 should be adjusted to fluidly couple the reserve bag 200 to the manifold 215 and that the non-reserve bags 200 should be replaced.

There may be specific points in time where the user knows in advance that they desire having the machine 100 operational (e.g., times of the day when the user knows there will be many customers). Conventionally, the user might exchange a used reservoir of mix for a new reservoir of mix in anticipation of one of these points in time, wasting whatever mix was left in the used reservoir. Because the machine 100 allows the user to completely empty a bag 200 of mix while maintaining a readily available supply of mix in the other bags 200, this potential source of waste is reduced or eliminated. Alternatively, the user might refill a reservoir with mix at room temperature in anticipation of one of these points in time, increasing the temperature of the mix within the reservoir above the desired temperature. Accordingly, a user may conventionally experience a period of down time after refilling a reservoir while the mix reaches the desired temperature. Because the machine 100 allows a user to exchange one or more of the bags 200 of mix while leaving at least one bag 200 within the machine 100, the machine 100 may supply mix at the desired temperature immediately after one or more bags 200 are exchanged, eliminating the down time associated with conventional machines.

Figure 7:
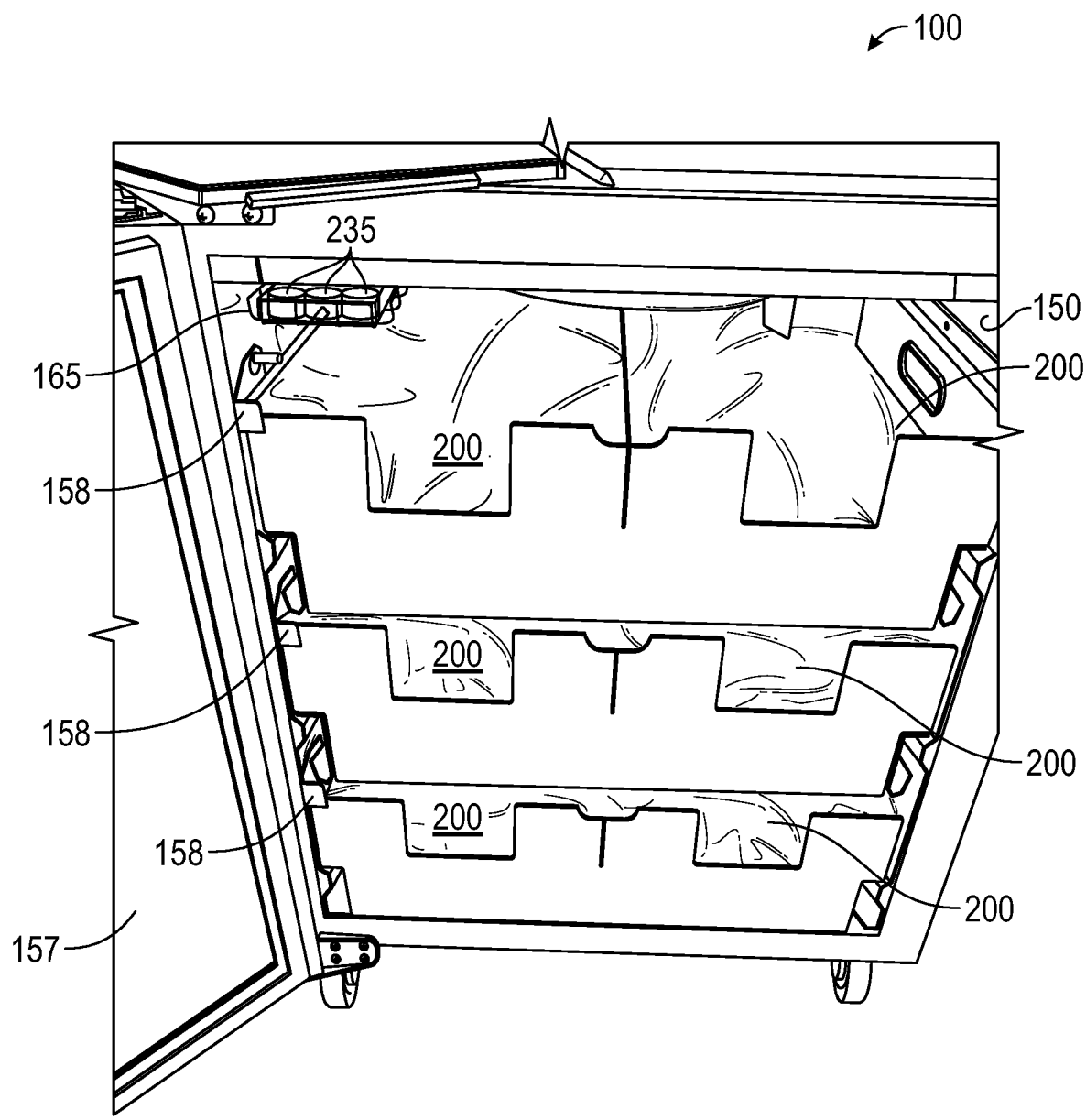
FIG. 7 is another perspective view of the inside of the frozen food product dispensing machine of FIG. 1.

As shown in FIGS. 5 and 7, in some embodiments, the bags 200 include caps 235 that seal the coupling 205, preventing leakage. In instances where the coupling 205 is a fill neck, the cap 235 may press or screw onto the fill neck in order to seal it. The user may want to keep these caps 235 available to reseal the bags 200 after use with the machine 100, (e.g., to save any mix that is left in the bag 200 at the end of the day or to seal any empty bag 200 so that it does not drip). In order to assist the user in keeping these caps 235 in a central location, in some embodiments, the machine 100 includes a tray 165. The tray 165 is configured to support and contain the caps 235. The tray 165 may be sized to contain at least one cap 235 for each bag 200 that the machine 100 is capable of connecting to simultaneously. As shown in FIG. 7, the tray 165 is positioned within the housing 150 such that the door 157 obstructs access to the tray 165 when the door 157 is in the closed position and allows access to the tray 165 when the door 157 is in the open position. In some embodiments, the tray 165 is made of a stainless steel wire mesh, but the tray 165 may be made from other materials as well (e.g., injection molded plastic). In some embodiments the tray 165 is removable without the use of tools in order to facilitate cleaning.

Figure 12:
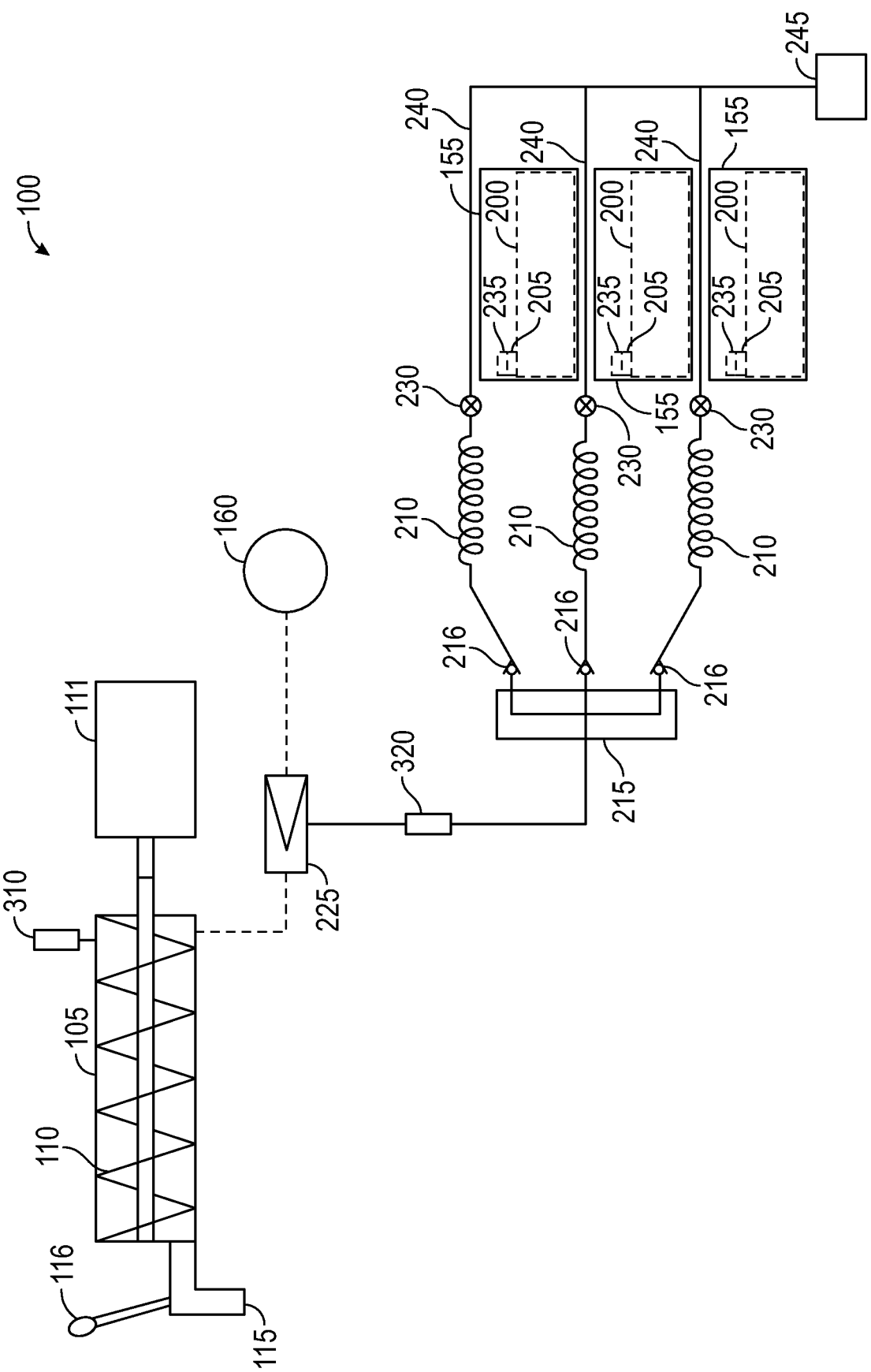
FIG. 12 is another schematic view of the frozen food product dispensing machine of FIG. 1 in a cleaning configuration.

In order to produce a consistent end product with the desired taste, the machine 100 may be cleaned regularly (e.g., daily). The parts of the machine 100 that normally come into contact with the mix or frozen product may be cleaned by running a sanitizing solution through the machine 100 along the same flow path travelled by the mix. Referring to FIGS. 5 and 12, the machine 100 is shown in a cleaning configuration. In some embodiments, one or more hoses 210 can be disconnected from the bags 200 and connected to an extension line 240 (e.g., using a coupling including a similar press fit or threaded connection to that of the bag coupling 205) that fluidly couples the hose 210 to a reservoir or supply 245 of sanitizing solution (e.g., a bucket). Because the drawers 155 support the bags 200, the extension lines 240 can be connected without removing the bags 200 from the machine 100. If desired, the caps 235 can be secured on the bags 200 to ensure that the bags 200 do not leak while disconnected from the hoses 210. The sanitizing solution can be drawn into and pumped through the machine 100 using the same pump 160 and mixing valve 225 that are used in normal operation. In this way, the solution reaches and cleans every surface that normally comes into contact with food product. Throughout this process, the length of cleaning time, the pressure inside the freezer barrel 105, the rate at which heat is removed by the refrigeration system, and the speed of the auger 110 may all be varied to ensure proper cleaning. After cleaning, the sanitizing solution can be drained through the spigots 115. This process can then be performed again with water to rinse out any remaining sanitizing solution.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A frozen food product dispensing machine, comprising:
    a housing;
    a freezer barrel disposed within the housing;
    a plurality of drawers slidably coupled to the housing and configured to each support a liquid food product mix reservoir;
    a manifold defining a plurality of inlets and an outlet, wherein the inlets are each fluidly coupled to one of the liquid food product mix reservoirs and the outlet is fluidly coupled to the freezer barrel to supply liquid food product mix from all of the liquid food product mix reservoirs to the freezer barrel;
    an air sensor comprising a pair of contacts disposed at least partially within a flow path of liquid food product mix,
    a user interface, and
    a controller operatively coupled to the air sensor and the user interface;
    wherein the air sensor is configured to provide a first signal to the controller when the contacts are electrically connected with a relatively small resistance indicative of the presence of liquid food product mix, wherein the air sensor is configured to provide a second signal different from the first signal to the controller when the two contacts are electrically connected with a relatively large resistance indicative of the presence of air, and wherein, in response to the controller receiving the second signal, the user interface is configured to provide a notification to a user indicating that one or more of the liquid food product mix reservoirs are depleted.

2. The frozen food product dispensing machine of claim 1, further comprising a plurality of shut-off valves, each shut-off valve disposed between one of the liquid food product mix reservoirs and the manifold, wherein each shut-off valve is movable to a closed position to fluidly decouple the corresponding liquid food product mix reservoir from the manifold.

3. The frozen food product dispensing machine of claim 1, wherein the contacts of the air sensor are disposed at least partially within a flow path between one of the liquid food product mix reservoirs and the manifold.

4. The frozen food product dispensing machine of claim 1, wherein the contacts of the air sensor are disposed at least partially within a flow path between the manifold and the freezer barrel.

5. A frozen food product dispensing machine, comprising:
    a housing;
    a freezer barrel disposed within the housing;
    a plurality of drawers slidably coupled to the housing and configured to each support a liquid food product mix reservoir;
    a manifold defining a plurality of inlets and an outlet, wherein the inlets are each fluidly coupled to one of the liquid food product mix reservoirs and the outlet is fluidly coupled to the freezer barrel to supply liquid food product mix from all of the liquid food product mix reservoirs to the freezer barrel; and
    a plurality of catches movably coupled to the housing, each catch positioned near one of the drawers such that each catch is paired to one of the drawers and each catch is movable between an extended position and a retracted position;

wherein each drawer is prevented from translating when the paired catch is in the extended position; and wherein each drawer is allowed to move freely when the paired catch is in the retracted position.

6. The frozen food product dispensing machine of claim 5, wherein each of the liquid food product mix reservoirs comprises a bag including a coupling through which the liquid food product mix exits the bag.

7. The frozen food product dispensing machine of claim 6, further comprising a plurality of coiled flexible hoses, each hose biased toward a retracted coiled position;

wherein each hose is coupled to one of the couplings;

wherein each hose extends when the drawer supporting the corresponding bag is moved to an open position; and wherein each hose biases the drawer to move from the open position toward a closed position.

8. The frozen food product dispensing machine of claim 1, further comprising:

a pump configured to draw liquid food product mix from the manifold to the freezer barrel; and a pressure sensor configured to detect a pressure within the freezer barrel;

wherein the controller is configured to stop operation of the pump when the detected pressure exceeds a predetermined threshold pressure.

9. A frozen food product dispensing machine, comprising:

a housing;

a freezer barrel disposed within the housing;

a plurality of drawers slidably coupled to the housing and configured to each support a liquid food product mix reservoir;

a manifold defining a plurality of inlets and an outlet, wherein the inlets are each fluidly coupled to one of the liquid food product mix reservoirs and the outlet is fluidly coupled to the freezer barrel to supply liquid food product mix from all of the liquid food product mix reservoirs to the freezer barrel;

a pump configured to draw liquid food product mix from the manifold to the freezer barrel;

a pressure sensor configured to detect a pressure within the freezer barrel; and a controller configured to stop operation of the pump when the detected pressure exceeds a predetermined threshold pressure;

wherein the pressure sensor is coupled directly to the freezer barrel.

10. The frozen food product dispensing machine of claim 1, further comprising:

a door rotatably coupled to the housing having an open position wherein the door does not obstruct access to the drawers and a closed position wherein the door encloses the drawers within the housing; and a tray disposed within the housing such that the tray is accessible with the door in the open position and obstructed with the door in the closed position.

11. A frozen food product dispensing machine, comprising:

a housing;

a freezer barrel disposed within the housing;

a plurality of drawers slidably coupled to the housing and configured to each support a liquid food product mix reservoir;

a pump configured to provide air and liquid food product mix to the freezer barrel;

a pressure sensor coupled directly to the freezer barrel and configured to detect a pressure within the freezer barrel;

a controller configured to stop operation of the pump when the detected pressure exceeds a predetermined threshold pressure;

an air sensor operatively coupled to the controller and comprising a pair of contacts disposed at least partially within a flow path of liquid food product mix; and a user interface operatively coupled to the controller;

wherein the air sensor is configured to provide a first signal to the controller when the contacts are electrically connected with a relatively small resistance indicative of the presence of liquid food product mix, wherein the air sensor is configured to provide a second signal different from the first signal to the controller when the two contacts are electrically connected with a relatively large resistance indicative of the presence of air, and wherein, in response to the controller receiving the second signal, the user interface is configured to provide a notification to a user indicating that one or more of the liquid food product mix reservoirs are depleted.

12. The frozen food product dispensing machine of claim 11, wherein each of the liquid food product mix reservoirs comprises a bag including a coupling through which the liquid food product mix exits the bag.

13. A frozen food product dispensing machine, comprising:

a housing;

a freezer barrel disposed within the housing;

a plurality of drawers slidably coupled to the housing and each supporting a liquid food product mix reservoir, each of the liquid food product mix reservoirs comprising a bag including a coupling through which the liquid food product mix exits the bag;

a pump configured to provide air and liquid food product mix to the freezer barrel;

a pressure sensor coupled directly to the freezer barrel and configured to detect a pressure within the freezer barrel;

a controller configured to stop operation of the pump when the detected pressure exceeds a predetermined threshold pressure; and a plurality of coiled flexible hoses, each hose biased toward a retracted coiled position;

wherein each hose is coupled to one of the couplings;

wherein each hose extends when the drawer supporting the corresponding bag is moved to an open position; and wherein each hose biases the drawer to move from the open position toward a closed position.

14. A frozen food product dispensing machine, comprising:

a housing;

a freezer barrel disposed within the housing;

a plurality of drawers slidably coupled to the housing and configured to each support a liquid food product mix reservoir;

a pump configured to provide air and liquid food product mix to the freezer barrel;

a pressure sensor coupled directly to the freezer barrel and configured to detect a pressure within the freezer barrel;

a controller configured to stop operation of the pump when the detected pressure exceeds a predetermined threshold pressure; and a plurality of catches movably coupled to the housing, each catch positioned near one of the drawers such that each catch is paired to one of the drawers and each catch is movable between an extended position and a retracted position;

wherein each drawer is prevented from translating when the paired catch is in the extended position; and wherein each drawer is allowed to move freely when the paired catch is in the retracted position.

15. A frozen food product dispensing machine, comprising:

a housing;

a freezer barrel disposed within the housing;

a plurality of drawers slidably coupled to the housing and configured to each support a bag configured to contain liquid food product mix, wherein each bag includes a coupling configured to allow the liquid food product mix to exit the bag; and a plurality of coiled flexible hoses, each hose biased to a retracted coiled position;

wherein each hose is attached to the coupling of the one of the bags;

wherein each hose extends when the drawer supporting the bag is moved to an open position; and wherein each hose biases the drawer to move from the open position toward a closed position.

16. The frozen food product dispensing machine of claim 15, further comprising a plurality of catches movably coupled to the housing, each catch positioned near one of the drawers such that each catch is paired to one of the drawers and each catch is movable between an extended position and a retracted position;

wherein each drawer is prevented from translating when the paired catch is in the extended position; and wherein each drawer is allowed to move freely when the paired catch is in the retracted position.

17. The frozen food product dispensing machine of claim 15, further comprising:

a pump configured to draw liquid food product mix from the bags to the freezer barrel;

a pressure sensor configured to detect a pressure within the freezer barrel; and a controller configured to stop operation of the pump when the detected pressure exceeds a predetermined threshold pressure.

18. The frozen food product dispensing machine of claim 15, further comprising an air sensor, a user interface, and a controller operatively coupled to the air sensor and the user interface, wherein the air sensor comprises two contacts disposed at least partially within a flow path of liquid food product mix, wherein the air sensor is configured to provide a first signal to the controller when the two contacts are electrically connected with a relatively small resistance indicative of the presence of liquid food product mix, wherein the air sensor is configured to provide a second signal different from the first signal to the controller when the two contacts are electrically connected with a relatively large resistance indicative of the presence of air, and wherein, in response to the controller receiving the second signal, the user interface is configured to provide a notification to a user indicating that one or more of the liquid food product mix reservoirs are depleted.

\* \* \* \* \*